(12) United States Patent
Blascok et al.

(10) Patent No.: US 7,562,602 B2
(45) Date of Patent: Jul. 21, 2009

(54) GEARSHIFT LEVER WITH REVERSE GEAR LOCK-OUT

(75) Inventors: Bohuslav Blascok, Dassel (DE); Martin Knagge, Seesen (DE)

(73) Assignee: Teleflex Automative Germany GmbH, Dassel (DE)

( * ) Notice: Subject to any disclaimer, the term of this patent is extended or adjusted under 35 U.S.C. 154(b) by 112 days.

(21) Appl. No.: 11/473,899

(22) Filed: Jun. 23, 2006

(65) Prior Publication Data

US 2007/0144296 A1 Jun. 28, 2007

(30) Foreign Application Priority Data

Dec. 23, 2005 (DE) ........................ 10 2005 062 167

(51) Int. Cl.
*B60K 20/00* (2006.01)
(52) U.S. Cl. ................................. 74/473.22; 74/473.21
(58) Field of Classification Search .............. 74/473.21, 74/473.22, 473.23, 500.5, 501.6
See application file for complete search history.

(56) References Cited

U.S. PATENT DOCUMENTS

| | | | | | |
|---|---|---|---|---|---|
| 1,881,790 | A | * | 10/1932 | Mapson | .................... 74/473.23 |
| 2,001,783 | A | * | 5/1935 | Heck et al. | ................. 192/48.4 |
| 4,343,202 | A | * | 8/1982 | Osborn | ..................... 74/473.23 |
| 4,524,635 | A | * | 6/1985 | Hulin et al. | .............. 74/473.22 |
| 4,726,249 | A | * | 2/1988 | Inuzuka et al. | ........... 74/473.34 |
| 4,914,969 | A | | 4/1990 | Lieb | |
| 5,036,722 | A | * | 8/1991 | Park | ........................ 74/473.22 |
| 5,566,581 | A | * | 10/1996 | Smale et al. | ............. 74/473.22 |
| 5,651,290 | A | * | 7/1997 | Osborn et al. | ............ 74/473.22 |
| 5,857,938 | A | * | 1/1999 | Porter | ......................... 477/99 |
| 6,082,214 | A | * | 7/2000 | Paparoni | .................. 74/473.22 |
| 6,176,809 | B1 | * | 1/2001 | Visser et al. | ................... 477/99 |
| 6,648,113 | B1 | * | 11/2003 | Bellfy | ....................... 192/3.63 |
| 2003/0074999 | A1 | * | 4/2003 | Shioji et al. | ............. 74/473.21 |

FOREIGN PATENT DOCUMENTS

| | | | |
|---|---|---|---|
| EP | 0 551 799 | A1 * | 7/1993 |
| EP | 0 834 683 | A1 | 4/1998 |
| EP | 1 111 276 | A2 | 6/2001 |

* cited by examiner

*Primary Examiner*—Richard W L Ridley
*Assistant Examiner*—Matthew A Johnson
(74) *Attorney, Agent, or Firm*—Baker & Hostetler LLP

(57) ABSTRACT

A gearshift lever with a reverse gear lock-out, having a manual gearshift lever with a gearshift knob, beneath which are placed the control line sheath, the ball, an elbow lever, and the transmission mechanism to actuate reverse gear. There is a lever of the reverse gear lock-out that can pivot around a pin in the housing, on which the transmission mechanism acts, and that blocks the motion of the elbow lever. The elbow lever has one shaft that can pivot on the housing and another shaft that receives a selector finger of the ball.

2 Claims, 3 Drawing Sheets

GEARSHIFT LEVER WITH REVERSE GEAR LOCK-OUT

BACKGROUND OF THE INVENTION

1. Field of the Invention

The invention relates to a gearshift lever with reverse gear lock-out gearing. The gearshift lever with reverse gear lock-out can be used as the gearshift mechanism of a manual-shift motor vehicle transmission with a reverse gear lock-out acting by form fit that comprises a movably mounted blocking element on the gearshift lever, with the gearshift lever rod having curvature between the gearshift knob and the control line sheath and the ball of the gearshift lever.

2. The Prior Art

Gearshift levers are provided in manual-shift transmissions of motor vehicles to engage a gear or to change gears. To this end, the gearshift lever is mounted to pivot around a gearshift shaft essentially perpendicular to it in order to select a shift slot around a selector shaft and to engage a gear. To prevent the driver from inadvertently shifting into reverse, a reverse gear lock-out has to be overcome or unlocked. This prevents inadvertently shifting into the reverse gear shift slot, or reaching the reverse gear shift slot from a neutral position of the shift slots in question. Whether the entire gear shift slot or only the reverse gear shift position is secured in this way is governed by whether the gear shift slot in question is assigned only to the reverse gear or also to a forward gear. The reverse gear lock-out with form fit action can be locked or unlocked by pressing down on the entire gearshift lever or by lifting an upper region of the gearshift lever. Various methods for this are known.

European Patent No. EP 1 111 276 A2 describes a gearshift lever for a reverse gear lock-out in which a control cable that lies outside of the gearshift rod is placed between the locking element for the reverse gear lock-out and in the control line mechanism. This gearshift lever has no curvature. The control cable is located directly on the pull ring, runs on both sides of the selector and gearshift rod, and moves a locking element on the gearshift lever that engages in a locking element on the car body.

U.S. Pat. No. 4,343,202 shows a gearshift lever that has slight curvature and a control cable for the reverse gear lock-out. The force of the control cable is fed into the shaft of the lever, with a costly angle mechanism being used to redirect the forces.

U.S. Pat. No. 4,914,969 describes a manual gearshift lever that has a push mechanism and a rod that lies outside of the lever. The gearshift lever is not curved. Pressure mechanisms of this kind are inconvenient for the driver of the vehicle to operate when they are located in the console of a passenger car. The control mechanism suggested in the document in turn can be adapted for curved gearshift levers only in combination with diversion mechanisms.

European Patent No. 0 834 683 A1 shows a control mechanism on a manual gearshift lever with the gearshift rod located outside of the gearshift lever. The mechanism for transmitting the control forces is unsuitable, of course, when the gearshift lever rod has sharp curvature.

No methods are known for a gearshift lever with a control mechanism directly beneath the gearshift knob that has sharp curvature between the control mechanism and the ball with which the control force can be easily transmitted to the lever for the reverse gear lock-out. The known methods block the motions of the gearshift lever to accomplish a reverse gear lock-out.

SUMMARY OF THE INVENTION

The purpose of the invention is therefore to develop a method with which the force of the control mechanism beneath the gearshift knob can be transmitted to the reverse gear lock-out, wherein the reverse gear lock-out is not to act directly on the gearshift lever.

The method pursuant to the invention provides for a gearshift lever with reverse gear lock-out that consists of the manual gearshift lever with a gearshift knob, beneath which is placed the control line sheath to actuate the reverse gear. The ball, the elbow lever, and the transmission mechanism such as a control cable to actuate the reverse gear are also on the gearshift lever. Various suitable mechanisms can be placed as the transmission mechanism between the control line sheath and reverse gear. Transmission can occur electronically, by sending a signal from the control line sheath to a magnet that actuates the lever of the reverse gear lock-out.

On the other hand, a cable control line is also possible for actuation, with a detent for the cable control line that may have a curvature, optionally even a sharp curvature, between the control line sheath and the ball, on the manual gearshift lever. This curvature can be S-shaped, but can also lead through two curves in different directions to the original course of the gearshift lever being continued displaced by a given distance. The control motion of the control line sheath can be transmitted by the proposed method, even in case of very sharp curvatures. Sharp curvatures are curvatures that have a very small radius of curvature or in which the gearshift rod can be continued very strongly through two curves with displacement between the first part of the gearshift rod and the second part of the gearshift rod.

If the transmission mechanism represents a control cable line, a detent is placed on the manual gearshift lever between the curvature of the control line sheath, with the core of the control cable line being connected to the control line sheath. There is also a detent on the housing for the cable control line, with the core of the cable control line being at an end of a lever of the reverse gear lock-out that can pivot around a pin in the housing. There is also an elbow lever whose one arm can pivot on the housing and whose other arm accepts the selector finger of the ball. With the proposed method, the motion of the gearshift lever is the same as always, but the motion of the elbow lever is blocked.

It is also possible to implement a reverse gear lock-out with a high degree of safety and with a simple construction, with sharply bent gearshift lever rods or with other structurally unfavorable conditions in the area of the gearshift lever.

It is advantageous to place a spring on the shaft of the selector lever.

It is also advantageous to place a spring acting against the control cable sheath on the shaft of the reverse gear lock-out lever.

It is also advantageous to make the elbow lever from plastic. The detent on the manual gearshift lever can be molded onto it.

When shifting into the individual gears, the manual gearshift lever is held in the slots 1, 2 by means of the stop. When switching from first to second gear, the manual gearshift lever goes into the selector slot between the two gears. In this position, motion between the elbow lever and the gearshift housing is blocked by the lever for the reverse gear lock-out. Therefore, shifting into reverse gear is impossible. If shifting to reverse gear is desired, the motion (stroke) is passed through the control cable line to the reverse gear lock-out lever. This lever is then rotated around its fastening pin in the housing and the blocking function is eliminated. Shifting to reverse gear then becomes possible. After shifting, the lever for the reverse gear lock-out is pushed back into the blocking function by a reset spring. This restores the blocking function with normal shifting. The control line sheath is also pulled back into its position by this spring through the cable control line and is defined without play.

BRIEF DESCRIPTION OF THE DRAWINGS

The invention is explained below with an example and three figures. The example relates to a transmission mechanism that is designed as a cable control line. Another variant, not shown, would be a magnet that actuates the reverse gear lock-out lever and that is operated by the control mechanism on the manual gearshift lever rod, wherein the signal can be transmitted electronically or wirelessly.

DETAILED DESCRIPTION OF THE PREFERRED EMBODIMENT

Figure 1:
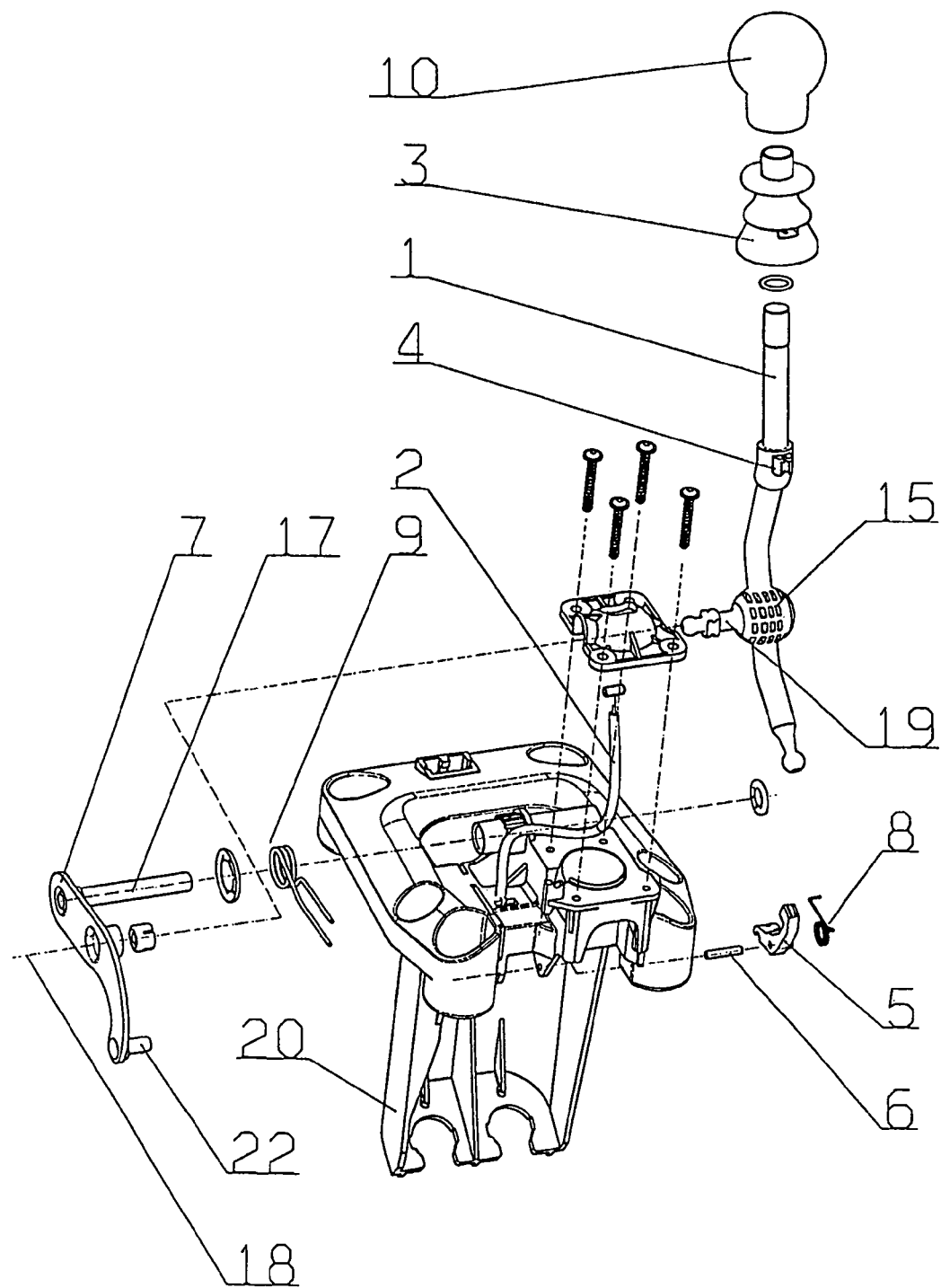
FIG. 1 shows a gearshift lever with control line sheath and cable control line for the reverse gear lock-out.

Referring now in detail to the drawings, FIG. 1 shows the gearshift lever with reverse gear lock-out, consisting of manual gearshift lever 1 or the manual gearshift lever rod, at the top end of which is gearshift knob 10, beneath which is located control line sheath 3. Detent 4 for cable control line 2 of the reverse gear lock-out has been molded onto manual gearshift lever rod 1. Ball 15 of manual gearshift lever 1 is placed after curve 16, and selector finger 19 is located on it. Selector finger 19 is fastened into a shaft 18 of elbow lever 7 that can pivot around rotational shaft 17 and that has ball peg 22 for the selector control cable. Spring 9 is placed on rotational shaft 17 of elbow lever 7. Lever 5 for reverse gear lock-out is moved on a pin 6, with a spring 8 also being put in place that urges lever 5 back into the blocking position, and draws control line sheath 3 back into its starting position through cable control line 2, 23.

Figure 2:
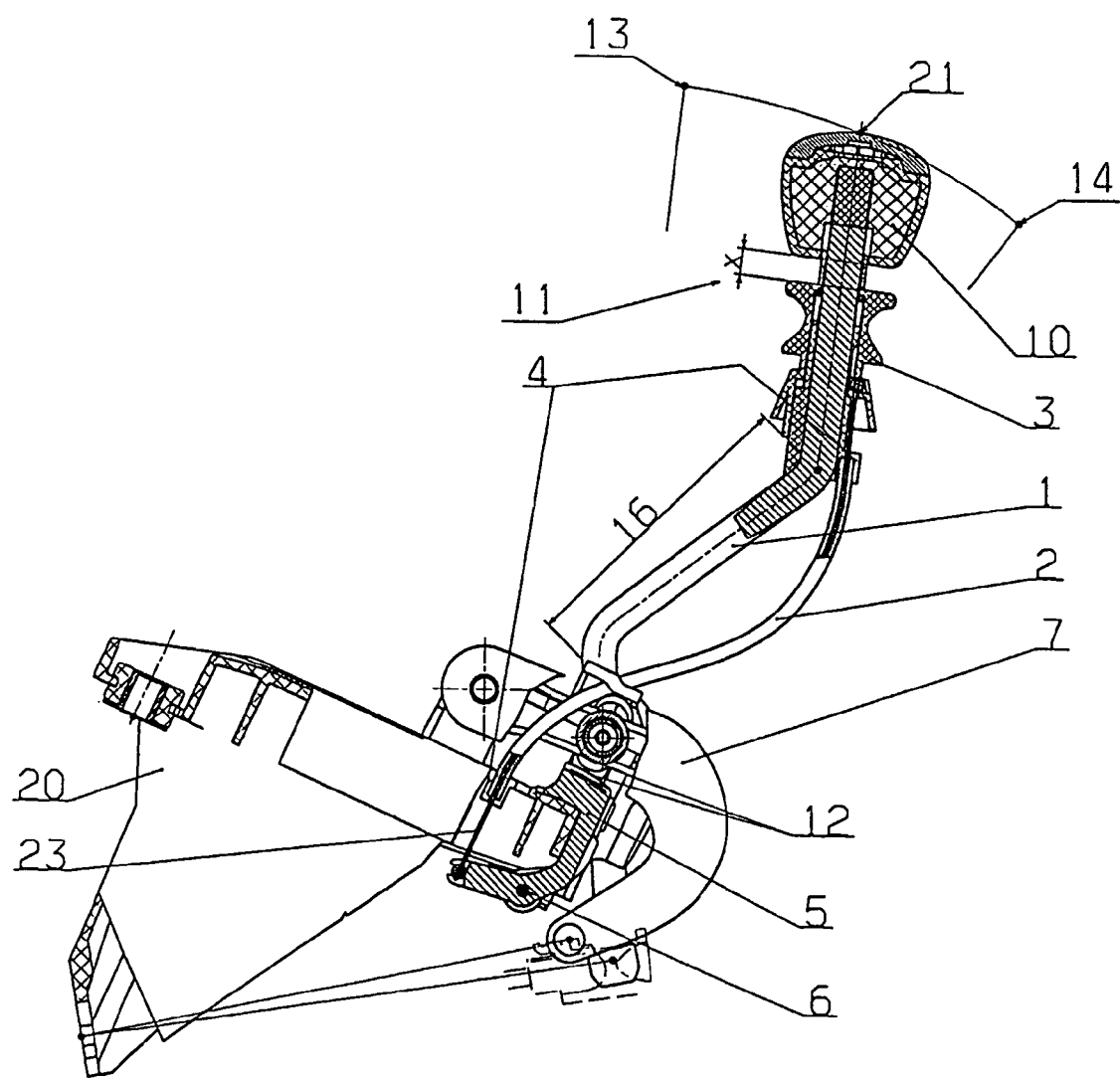
FIG. 2 shows a gearshift lever in partial cross section and plan view.

All components are held by housing 20, as seen in FIG. 2 in a partially cut-away view, in which gearshift lever 1 is shown in neutral position 21 between positions 13 for 1st, 3rd, and 5th gears, and position 14 for 2nd, 4th, and 6th gears. Control line sheath 3 can move by stroke 11, with core 23 of cable control line 2 being fastened in control line sheath 3 and being moved by distance 11. Cable control line 2 and/or its sheath is hung in detent 4 above curve 16 and transports the motion of core 23 of the cable control line to lever 5 for the reverse gear lock-out, which is moved around pin 6. The other end of cable control line 2 finds resistance in housing 20 and detent 4 located in it.

Figure 3:
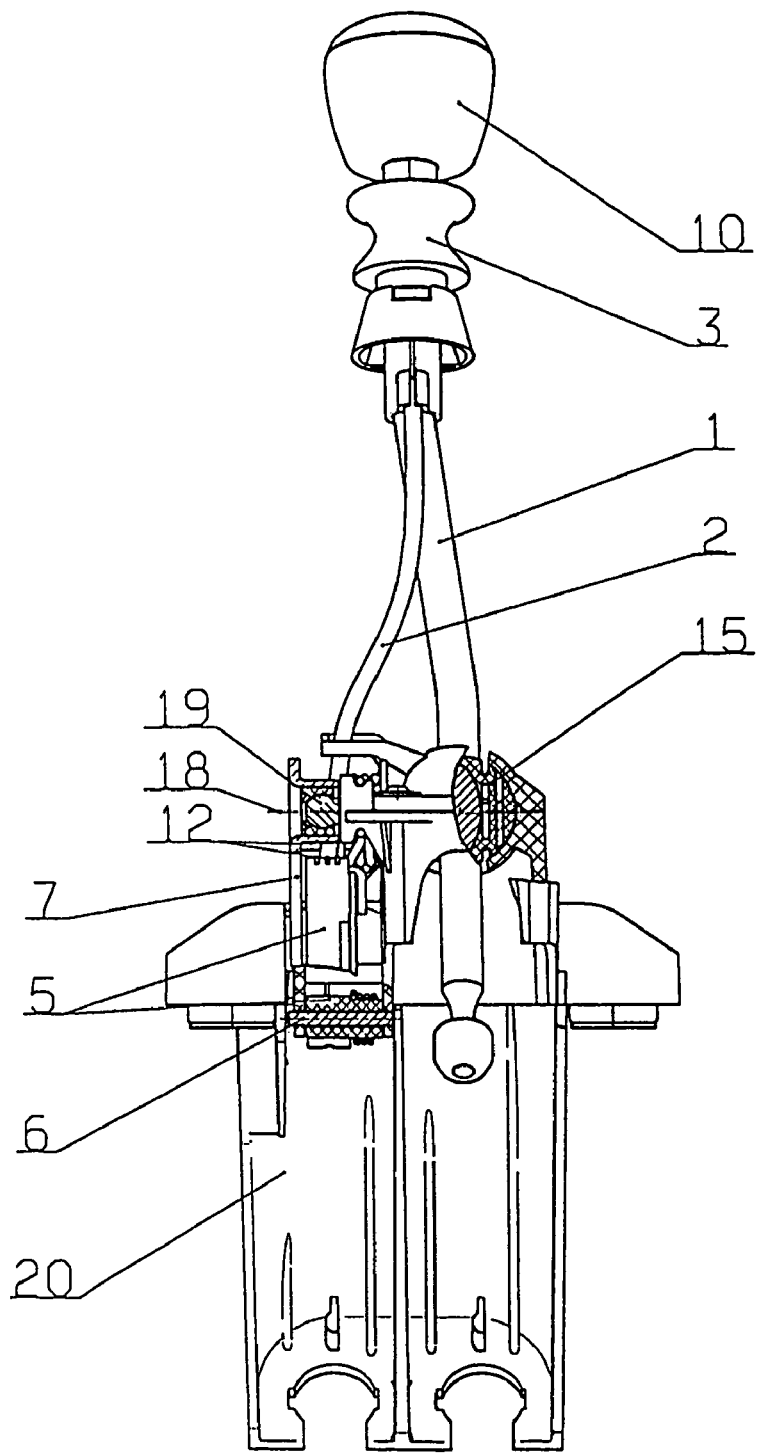
FIG. 3 shows a gearshift lever in side view and partial cross section through its housing.

FIG. 3, which shows another view of FIG. 2, makes it clear that cable control line 2 also transmits the motion of control line sheath 3 along the axis of selector finger 19, and how lever 5 of the reverse gear lock-out is positioned.

The shifting process will be described with reference to FIG. 2. Gearshift lever 1 shown is in neutral position 21, in the selector slot between 1st, 3rd, 5th, and 2nd, 4th, and 6th gears. To shift into the individual gears, gearshift lever 1 is moved either to right into position 14 or to left into position 13. The motion of the gearshift lever along shaft 18 (FIG. 3) is limited by lever 5, which constitutes a stop for elbow lever 7. Thus shifting into the reverse gear slot is then initially impossible. To shift into reverse gear, control line sheath 3 is pulled upward. With this, lever 5 for the reverse gear lock-out is rotated around its axis 6 by means of cable control line 2 or its core 23, for which a force against spring 8 has to be applied. Lever 5 is thus removed from the region between elbow selector slot 18 and housing 20, which forms on open space for the motion of the elbow lever and with it of the gearshift lever to the reverse gear slot. With this, shifting into reverse gear then becomes possible. Its position depends on the particular gearshift diagram and the transmission variant of the vehicle. After shifting to reverse gear, gearshift lever 1 is pushed into a position in which lever 5 for the reverse gear lock-out is pulled by spring 8 and the blocking function is restored. Control line sheath 3 is also drawn back into its starting position by spring 8 through cable control line 2 and its core 23.

The proposed method has the advantage that even with sharply curved manual gearshift levers, the lever for the reverse gear lock-out can be actuated by a control mechanism on the manual gearshift lever rod without diversion and without costly mechanisms.

Accordingly, while only a few embodiments of the present invention have been shown and described, it is obvious that many changes and modifications may be made thereunto without departing from the spirit and scope of the invention.

LIST OF REFERENCE SYMBOLS USED

1 Manual gearshift lever/Manual gearshift lever rod
2 Transmission mechanism such as cable control line for reverse gear lock-out
3 Control line sheath
4 Detent for cable control line
5 Lever for the reverse gear lock-out
6 Pin
7 Elbow lever
8 Spring to reset the lever 5 for the reverse gear lock-out
9 Spring to reset the elbow lever 7
10 Gearshift knob
11 Stroke of the control line sheath 3
12 Impact surface of the slot between first and second gears
13 Position of 1st, 3rd, and 5th gears
14 Position of 2nd, 4th, and 6th gears
15 Ball of the manual gearshift lever 1
16 Curvature area of the gearshift lever
17 Rotational shaft of the elbow lever
18 Shaft for fastening the selector finger 19 on the elbow lever 7
19 Selector finger of the ball 15
20 Housing
21 Neutral position of the manual gearshift lever 1
22 Ball peg for the selector control cable on the elbow lever 7
23 Core of the cable control line 2

What is claimed is:

1. A gearshift lever with reverse gear lock-out, comprising:
a manual gearshift lever with a gearshift knob;
a control line sheath connected to the manual gearshift lever;
a cable control line connected to the gearshift lever to actuate the reverse gear lock-out;
a ball having a selector finger and being located beneath the manual gearshift lever;
a housing located beneath the manual gearshift lever;
an elbow lever located beneath the manual gearshift lever, said elbow lever having one shaft that pivots on the housing and another shaft that receives the selector finger of the ball;

a lever of the reverse gear lock-out that pivots around a pin in the housing, said cable control line acting on said lever of the reverse gear lock-out and blocking the motion of the elbow lever; and a first detent for the cable control line on the manual gearshift lever, said manual gearshift lever having a curvature between the control line sheath and the ball, said first detent being located on the manual gearshift lever between the curvature and the control line sheath, and a core of the cable control line having an end being connected to the control line sheath, and a second detent on the housing for the cable control line, an opposite end of the core of the cable control line being connected to one end of the lever of the reverse gear lock-out.

2. A gearshift lever according to claim 1, wherein the first detent on the manual gearshift lever is molded onto the manual gearshift lever.

* * * * *

UNITED STATES PATENT AND TRADEMARK OFFICE
CERTIFICATE OF CORRECTION

PATENT NO. : 7,562,602 B2 Page 1 of 1
APPLICATION NO. : 11/473899
DATED : July 21, 2009
INVENTOR(S) : Bohuslav Blascok and Martin Knagge It is certified that error appears in the above-identified patent and that said Letters Patent is hereby corrected as shown below:

Column 4, line 55, please replace "with reverse" with --with a reverse--.

Signed and Sealed this

Twenty-fifth Day of August, 2009

David J. Kappos
*Director of the United States Patent and Trademark Office*